United States Patent [19]

Hayasaki

[11] Patent Number: 4,603,240
[45] Date of Patent: Jul. 29, 1986

[54] SWITCH ARRANGEMENT INCLUDING MEANS FOR FACILITATING ACCURATE LOCATION THEREOF

[75] Inventor: Koichi Hayasaki, Zama, Japan

[73] Assignee: Nissan Motor Co., Ltd., Yokohama, Japan

[21] Appl. No.: 748,138

[22] Filed: Jun. 24, 1985

Related U.S. Application Data

[63] Continuation of Ser. No. 544,246, Oct. 21, 1983, abandoned.

[51] Int. Cl.⁴ .............................................. H01H 19/04
[52] U.S. Cl. ............................... 200/61.91; 200/61.88; 74/473 R
[58] Field of Search ............... 200/61.87, 61.88, 61.91; 74/473 R, 475, 477

[56] References Cited

U.S. PATENT DOCUMENTS 2,662,189 12/1953 Brown ........................ 200/61.88 X
3,189,701 6/1965 Brown ........................... 200/61.88
4,022,078 5/1977 Malott ....................... 200/61.88 X
4,193,316 3/1980 Kelbel ....................... 200/61.91 X
4,378,474 3/1983 Olson ........................ 200/61.91 X

FOREIGN PATENT DOCUMENTS 0164417 12/1981 Japan ........................... 200/61.88
0664232 5/1979 U.S.S.R. ....................... 200/61.91

*Primary Examiner*—G. P. Tolin
*Attorney, Agent, or Firm*—Schwartz, Jeffery, Schwaab, Mack, Blumenthal & Evans

[57] ABSTRACT

Accurate location of a switch body is assured by providing a switch lever and a lever which operates the switch lever, with alignment apertures the centers of which describe arcs which intersect at only one or two positions and which allow the levers to locked together via the insertion of a probe until a third aperture, provided in the switch body, can be aligned with the first and second ones.

15 Claims, 7 Drawing Figures

SWITCH ARRANGEMENT INCLUDING MEANS FOR FACILITATING ACCURATE LOCATION THEREOF

This application is a continuation of application Ser. No. 544,246, filed Oct. 21, 1983, now abandoned.

BACKGROUND OF THE INVENTION

1. Field of the Invention

The present invention relates generally to a switch and more specifically to a switch arrangement which includes means for accurately positioning same on a device.

2. Description of the Prior Art

In a previously proposed inhibitor switch arrangement for an automatic transmission it has been arranged that a switch body 1 and a lever 2 pivotally mounted on the body, are both provided with alignment apertures 3, 4 through which a probe 5 (see FIG. 3 for example) is insertable to facilitate the accurate location of the switch body on a transmission casing 6. This arrangement, while proving effective has required that an externally disposed gear select lever 7, which is operatively connected to the switch lever 2, will be held firmly in place by a detent mechanism 8 of the nature shown in FIGS. 1 and 2, and thus firmly hold the switch lever in place.

As the manufacture of the detent mechanism shown in FIG. 2 is relatively expensive due to the need to accurately bore the blind hole 9 in which the spring 10 is disposed, it has been proposed to use a leaf spring 11 such as shown in FIG. 5 in place thereof. This however, has lead to the problems that a degree of play, not experienced with the FIG. 2 detent mechanism, reduces the degree to which the gear select lever 7 can be relied upon to hold the switch lever in a given position while adjusting the position of the switch body on the transmission casing.

SUMMARY OF THE INVENTION

It is an object of the present invention to provide a switch arrangement such as an automatic automotive inhibitor switch which may be precisely positioned and secured in place on a transmission casing or the like, even when a degree of play is present in the lever or levers via which the switch is operated.

In brief the present invention features an arrangement wherein accurate location of a switch body is assured by providing a switch lever and a lever which operates the switch lever, with alignment apertures the centers of which describe arcs which intersect at one or two positions. This allows the levers to be locked together by the insertion of a probe until a third aperture, provided in the switch body, can be aligned with the first and second.

More specifically, the present invention takes the form of a device for indicating when a transmission assumes a predetermined state in response to the operation of a manually operable member associated therewith, comprising: a switch body mounted on the transmission, a switch lever pivotally mounted on the switch body and arranged to operate a switch housed within said switch body, a gear select lever associated with the transmission and operatively connected with the switch lever for moving the switch lever in accordance with the movement of the manually operable member, a first alignment aperture formed in the gear select lever, and a second alignment aperture formed in the switch lever, the first and second alignment apertures being arranged to be aligned only when the gear select lever and the switch lever assume a predetermined relationship with one and other.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 3:
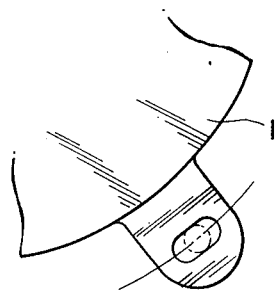
FIG. 3 is a plan view of one of the three bolt attachment flanges provided on the switch body (or an associated member) in which a curved adjustment slot is formed.
Figure 4:
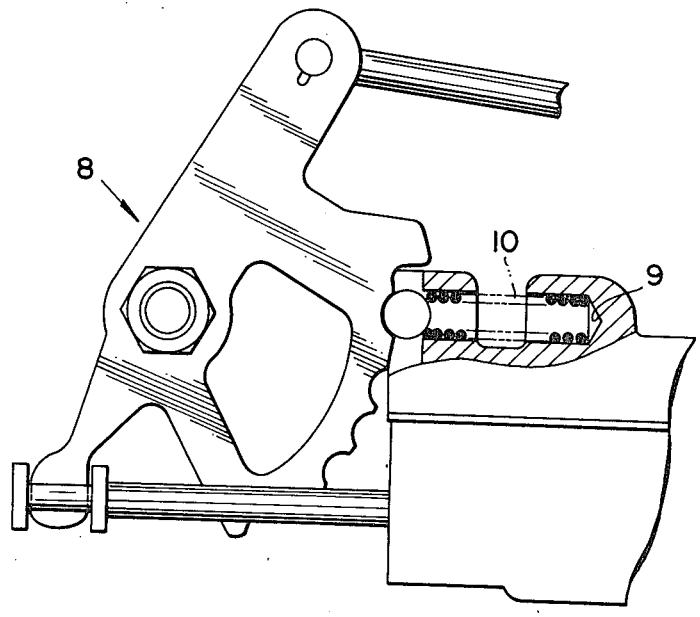
FIG. 4 shows in elevation, the detent plate and spring loaded ball device discussed briefly in the opening paragraphs of the present disclosure.
Figure 6:
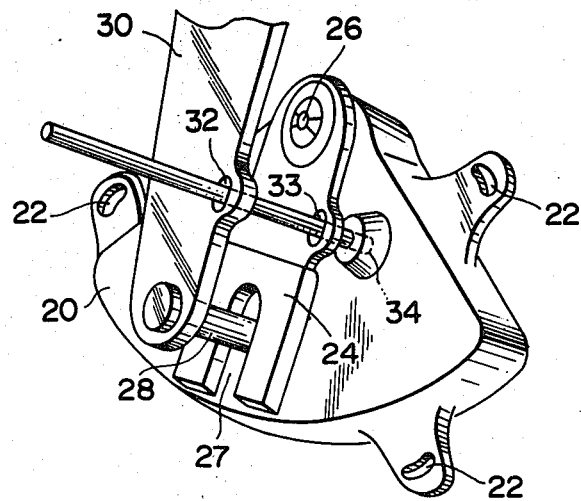
FIG. 6 is a perspective view of an embodiment of the present invention.
Figure 7:
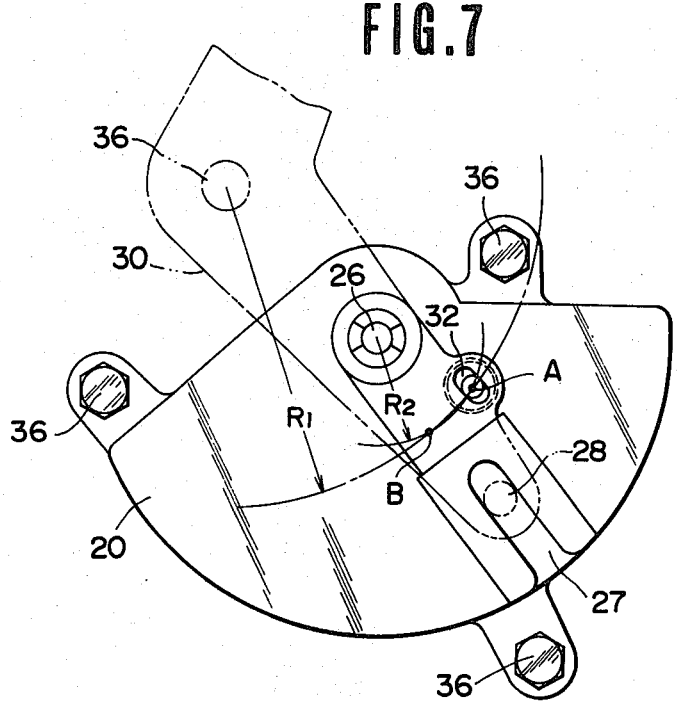
FIG. 7 is an elevational view of the arrangement shown in FIG. 6, showing the geometry which forms the crux of the present invention and which facilitates the accurate location of the switch body.

FIGS. 6 and 7 show an embodiment of the present invention. In this arrangement a switch body 20 is provided with attachment flanges in which curved adjustment slots 22 (similar to those shown in FIG. 3) are formed. The length and curvature of these slots 22 is such as to permit limited rotation of the switch body 20. A switch lever 24 is mounted on the switch body 20 so as to be pivotal about the axis of a shaft 26 operatively connected with the switch mechanism disposed within the switch body. The switch lever 24 is formed with an elongate slot 27 in which a pin 28 extending from a gear select lever 30 is receivable.

The gear select lever 30, the switch lever 24 and switch body 20 are formed with first second and third alignment apertures 32, 33, 34 respectively. These apertures are sized so that an adjustment probe (see FIG. 6) may be inserted therethrough to faciliate proper positioning of the switch body on the transmission casing.

As best seen in FIG. 7, the first alignment aperture 32 is formed in the gear select lever 30 in a manner that the center thereof is located at a distance $R_1$ from the axis of the shaft 36 about which the gear select lever 30 is pivotal. The second aperture 33 is formed so that the center thereof is located at a distance $R_2$ from the axis of the shaft 26. As will be appreciated the arcs described by the centers of the first and second apertures is such as to intersect at two locations (viz., A and B). Accordingly, it is possible with this arrangement to align the first and second apertures 32, 33 at two locations only, viz., those in which the centers thereof a coaxially aligned with the points A and B. Furthermore, insertion of a probe such as shown in FIG. 6 through the first and second apertures 32, 33 will cause the two levers 24, 30 to be locked in place. Hence, by locating the first and second apertures approximately over the third alignment aperture 34, insertion of a probe member will lock the levers 24, 30 in position whereby the bolts 36 may be slackened and the switch body 20 rotated manually until the probe may be inserted into the third aperture 34. At this time the bolts 36 may be tightened with the switch body 20 properly located on the transmission casing. To facilitate both production and easy adjustment, the center of curvature of the slots 22 is preferable coincident with the axis of rotation of the switch lever 24.

Figure 1:
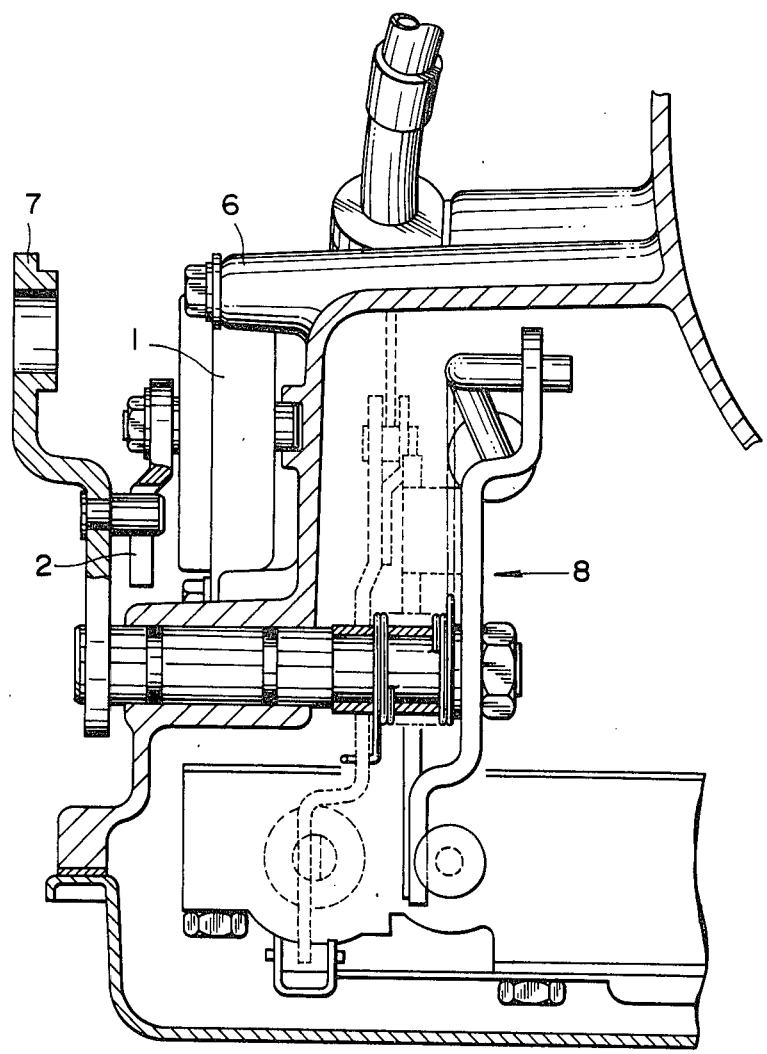
FIG. 1 is a sectional view of an F-F type transaxle transmission case wherein an inhibitor switch is mounted above a shaft on which the gear select lever and the detent plate of the detent mechanism used to hold the select lever in place, are mounted.
Figure 2:
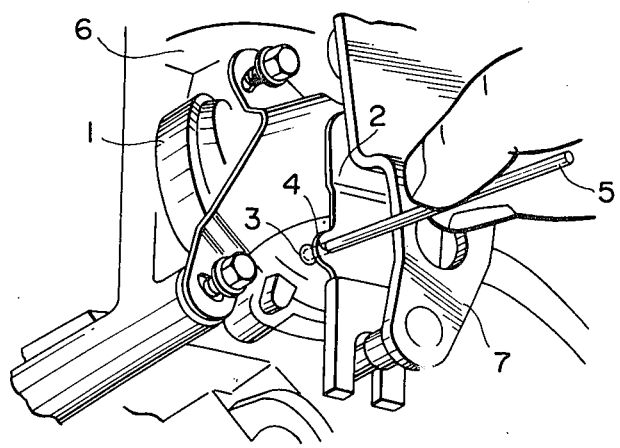
FIG. 2 is a perspective view of the inhibitor switch shown in FIG. 1 mounted on a F-R type drive train transmission casing and which shows the position of the switch body being adjusted via the use of a probe.
Figure 5:
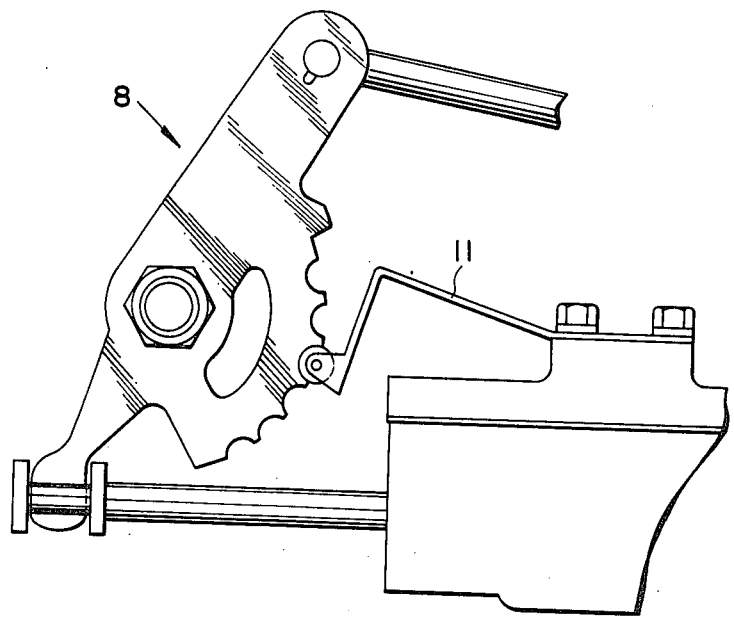
FIG. 5 is a view showing a detent device similar to that shown in FIG. 4 illustrating the use of the leaf spring briefly discussed in the opening paragraphs of the present application.

The above disclosed embodiment is such that the switch body 20 is located beneath the shaft 36 on which the gear select lever 30 and a detent plate such as shown in FIGS. 5 and 6 are mounted. However, it is possible to apply the present invention to arrangements such as shown in FIG. 1, wherein the switch body 20 is located above the shaft on which the gear select lever and the detent plate are mounted. That is to say, the invention may be implemented as long as the arcs described by the centers of the first and second apertures 32, 33 are such as to intersect one another at at least one position and this position is selected such that alignment of the third aperture 34 therewith will appropriately orient the switch body 20.

What is claimed is:

1. A device for indicating when a transmission assumes a predetermined state in response to the operation of a manually operable member associated therewith, comprising:
   a transmission body;
   a switch body mounted on said transmission body;
   a switch lever pivotally mounted on said switch body and arranged to operate a switch housed within said switch body;
   a gear select lever pivotally mounted on said transmission body;
   means operatively connecting said gear select lever with said switch lever for mounting said switch lever in accordance with the movement of said manually operable member;
   a first alignment aperture formed in said gear select lever; and
   a second alignment aperture formed in said switch lever;
   said first and second alignment apertures being distinct from said connecting means and being arranged to be aligned such that the axis of one aperture intersects the middle of the width of the other aperture only when said gear select lever and said switch lever assume a desired predetermined relationship with one another in which said switch body is disposed in desired alignment with respect to said transmission body and the switch properly indicates the position of the gear select lever.

2. A device for indicating when a transmission assumes a predetermined state in response to the operation of a manually operable member associated therewith, comprising:
   a switch body mounted on said transmission;
   a switch lever pivotally mounted on said switch body and arranged to operate a switch housed within said switch body;
   a pivotable gear select lever connected to said transmission and also operatively connected with said switch lever for moving said switch lever in accordance with the movement of said manually operable member;
   a first alignment aperture formed in said gear select lever;
   a second alignment aperture formed in said switch lever;
   said first and second alignment apertures being aligned along a line perpendicular to the levers and parallel to the axis about which the levers pivot only when said gear select lever and said switch lever assume a predetermined desired relationship with one another in which the switch properly signals the position of the gear select lever, and
   wherein said gear select lever and said switch lever may be locked together in said predetermined relationship in a manner that prevents either from pivoting by insertion of a straight probe of uniform diameter through said first and second alignment apertures.

3. A device as claimed in claim 2, further comprising: a third alignment aperture formed in said switch body, said third alignment aperture being located so that when said first, second and third alignment apertures are aligned said switch body assumes said desired predetermined orientation with respect to said transmission body.

4. A device as claimed in claim 3, wherein said switch body is mounted on said transmission body by a fastening arrangement which permits said switch body to be rotatable and to be selectively secured to said transmission body.

5. A device as claimed in claim 2, wherein said select lever is pivotal about a first axis and said first aperture is formed in said lever so that the center thereof is located at a first radius from said first axis, and wherein said switch lever is pivotal about a second axis and said second alignment aperture is formed so that the center thereof is located at a second radius from said second axis, said first and second radii being selected so that the arcs described by said centers intersect at a point.

6. A device as claimed in claim 5, wherein said point is selected to coincide with the center of said third alignment aperture when said switch body assumes said predetermined desired orientation.

7. A device as claimed in claim 3, wherein said third alignment aperture is adapted to receive said probe.

8. A device as claimed in claim 2, further comprising a detent mechanism for selectively holding said select lever in a selected one of a plurality of preselected positions, said detent mechanism comprising:
   a plate synchronously movable with said select lever, said plate being formed with a plurality of sequential recesses, and
   a spring fixed at one end to said transmission and provided at the other end with a rolling device receivable in each of said plurality of recesses.

9. A device as claimed in claim 8, wherein said plate is pivotal about said first axis and is operatively connected to said transmission in a manner that the angular position of said plate determines the state of said transmission.

10. A device as claimed in claim 8, further comprising a manual selector valve which is moved by the movement of said plate.

11. In a transmission
a transmission casing in which a gear train is disposed;
a control device for controlling said gear train including;
(a) a manually operable member, and
(b) a gear select lever pivotally mounted on said casing and operatively connected between said gear train and said manually operable member, said gear select lever being arranged to induce said gear train to assume a predetermined state upon assuming a predetermined position under the influence of said manually operable member;
a switch for indicating when said transmission assumes said predetermined state, said switch including:
(a) a switch body adjustably fastened to said casing, and
(b) a switch lever pivotally mounted on said switch body and operatively connected with said gear select lever; and
an arrangement for facilitating the positional alignment of said switch body on said casing so as to accurately output a signal indicating when said transmission assumes said predetermined state, comprising:
a first aperture formed in said gear select lever;
a second aperture formed in said switch lever; and
a third aperture formed in said switch body;
said first, second and third apertures being arranged to align such that the axis of one aperture intersects the middle of the width of each of the other two apertures simultaneously only when said gear select lever has assumed said predetermined position and said switch body has assumed a desired orientation with respect to said transmission casing and in which said switch lever has assumed a desired orientation so that said switch indicates said transmission has assumed said predetermined state.

12. A transmission as claimed in claim 11, wherein said first and second apertures define means into which a probe may be inserted to lock said gear select lever and said switch lever in a predetermined relationship and thus compensate for any play in said gear select lever which may induce an incorrect positional adjustment of said switch body.

13. A transmission as claimed in claim 12, wherein said third aperture is arranged to receive said probe therein.

14. A device as claimed in claim 3, wherein said select lever is pivotal about a first axis and said first aperture is formed in said lever so that the center thereof is located at a first radius from said first axis, and wherein said switch lever is pivotal about a second axis and said second alignment aperture is formed so that the center thereof is located at a second radius from said second axis, said first and second radii being selected so that the arcs described by said centers intersect at a point.

15. An arrangement comprising:
a casing;
a switch body;
means detachably securing said switch body to said casing and for permitting the position of said switch body on said casing to be adjusted by a predetermined amount;
a first lever pivotally mounted on said casing so as to be pivotal about a first axis and essentially immovable in the direction of said first axis;
means defining a first aperture in said first lever at a first predetermined distance from said first axis;
a second lever pivotally mounted on said switch body so as to be pivotal about a second axis which is essentially parallel with and spaced from said first axis, said second lever being essentially immovable in the direction of said second axis;
means defining a second aperture in said second lever at a second predetermined distance from said second axis, said second aperture having a width which is essentially the same as the width of said first aperture;
said first and second predetermined distances being selected so that the locii of the centers of said first and second apertures intersect at first and second locations and so that when said apertures are aligned at said first and second locations and a probe is inserted therethrough, said first and second levers are locked together in a manner that prevents either from pivoting about its respective axis; and
means defining a third aperture in said switch body, said third aperture having a width essentially the same as the widths of said first and second apertures, said first, second and third apertures being such that the axis of the third aperture intersects the middle of the width of each of the first and second apertures simultaneously only when said switch body is located in a desired predetermined position on said casing, and therefore the position of said switch body on said casing is easily adjustable to said desired position by means of a straight probe inserted through said first, second and third apertures and adjusting said securing means to fasten said switch body in said desired position in which said first, second and third apertures are aligned by said probe.

* * * * *